United States Patent
Chien et al.

(10) Patent No.: US 11,188,267 B2
(45) Date of Patent: Nov. 30, 2021

(54) METHOD AND APPARATUS AND COMPUTER PROGRAM PRODUCT FOR HANDLING SUDDEN POWER OFF RECOVERY

(71) Applicant: Silicon Motion, Inc., Zhubei (TW)

(72) Inventors: Jieh-Hsin Chien, Taoyuan (TW); Yi-Hua Pao, Hsinchu (TW)

(73) Assignee: SILICON MOTION, INC., Zhubei (TW)

( * ) Notice: Subject to any disclaimer, the term of this patent is extended or adjusted under 35 U.S.C. 154(b) by 0 days.

(21) Appl. No.: 16/865,516

(22) Filed: May 4, 2020

(65) Prior Publication Data

US 2020/0371718 A1 Nov. 26, 2020

(30) Foreign Application Priority Data

May 21, 2019 (CN) .......................... 201910423585.0

(51) Int. Cl.
 *G06F 3/06* (2006.01)
 *G06F 1/30* (2006.01)
(52) U.S. Cl.
 CPC .............. *G06F 3/0659* (2013.01); *G06F 1/30* (2013.01); *G06F 3/064* (2013.01); *G06F 3/0619* (2013.01); *G06F 3/0653* (2013.01); *G06F 3/0679* (2013.01)
(58) Field of Classification Search
 CPC ...... G06F 3/0659; G06F 3/064; G06F 3/0619; G06F 1/30
 See application file for complete search history.

(56) References Cited

U.S. PATENT DOCUMENTS

| 2012/0284587 A1 | 11/2012 | Yu et al. |
| 2013/0148435 A1 | 6/2013 | Matsunaga |
| 2013/0275650 A1 | 10/2013 | Hida et al. |

(Continued)

FOREIGN PATENT DOCUMENTS

| CN | 104077174 A | 10/2014 |
| CN | 106155874 A | 11/2016 |

(Continued)

OTHER PUBLICATIONS

Memblaze_2011, MemSolid2.0: pSLC + multiple backups to ensure metadata security, csdn.net, 2015 [retrieved from internet Jun. 2, 2021][<URL:https://blog.csdn.net/Memblaze_2011/article/details/47165223>] (Year: 2015).*

(Continued)

*Primary Examiner* — David Yi
*Assistant Examiner* — Nicholas A. Paperno
(74) *Attorney, Agent, or Firm* — Birch, Stewart, Kolasch & Birch, LLP

(57) ABSTRACT

The invention introduces a method for handling sudden power off recovery, performed by a processing unit of an electronic apparatus, to include: driving a flash interface to program data sent by a host into pseudo single-level cell (pSLC) blocks of multiple logical unit numbers (LUNs) in a single-level cell (SLC) mode with multiple channels after detecting that the electronic apparatus has suffered a sudden power off (SPO). The pSLC blocks are reserved from being written any data in regular operations until the SPO is detected.

17 Claims, 7 Drawing Sheets

(56) References Cited

U.S. PATENT DOCUMENTS

| | | | |
|---|---|---|---|
| 2014/0059406 A1* | 2/2014 | Hyun | G11C 11/5621 714/773 |
| 2015/0149702 A1 | 5/2015 | Yeh | |
| 2016/0224089 A1 | 8/2016 | Lin | |
| 2016/0268000 A1 | 9/2016 | Thompson et al. | |
| 2016/0378344 A1 | 12/2016 | Nachimuthu et al. | |
| 2018/0260331 A1 | 9/2018 | Kotte et al. | |
| 2018/0349240 A1* | 12/2018 | Ji | G06F 11/2094 |
| 2019/0065397 A1* | 2/2019 | Troia | G06F 11/1004 |
| 2019/0102083 A1 | 4/2019 | Dusija et al. | |

FOREIGN PATENT DOCUMENTS

| | | |
|---|---|---|
| CN | 108782669 A | 11/2018 |
| JP | 2012-141946 A | 7/2012 |
| JP | 2013-122793 A | 6/2013 |
| JP | 2015-512110 A | 4/2015 |
| TW | 201403318 A | 1/2014 |
| TW | 201521027 A | 6/2015 |
| WO | WO 2010/111694 A2 | 9/2010 |
| WO | WO 2013/138552 A1 | 9/2013 |

OTHER PUBLICATIONS

English translation of the Japanese Search Report for Japanese Application No. 2019-110012, dated Sep. 15, 2020.
I/O editorial department, "Computer techcsology utilization in the "smartphone" era". Engineering Co., Ltd., First Edition, Jul. 20. 2016, pp. 45-46, with Engish translation.
Kitagawa et al., "SSD Compiete Understanding Reading". Impress Japan, Inc.. First Edition, Mar. 11, 2013, pp. 132-134, 140-142. with English translation.
English translation of the Taiwanese Search Report dated Oct. 7, 2020 for Application No. 108117396.
English translation of Taiwanese Search Report for Taiwanese Application No. 108117396, dated Feb. 2, 2021.
English translation of the Japanese Search Report for Japanese Application No. 2019-118012, dated Apr. 13, 2021.
English translation of the Taiwanese Search Report dated May 25, 2020 for Application No. 108117396.

* cited by examiner

METHOD AND APPARATUS AND COMPUTER PROGRAM PRODUCT FOR HANDLING SUDDEN POWER OFF RECOVERY

CROSS-REFERENCE TO RELATED APPLICATIONS

This application claims the benefit of priority to Patent Application No. 201910423585.0, filed in China on May 21, 2019; the entirety of which is incorporated herein by reference for all purposes.

BACKGROUND

The disclosure generally relates to data-storage device and, more particularly, to method and apparatus and computer program product for handling sudden power off recovery.

Flash memory devices typically include NOR flash devices and NAND flash devices. NOR flash devices are random access—a host accessing a NOR flash device can provide the device any address on its address pins and immediately retrieve data stored in that address on the device's data pins. NAND flash devices, on the other hand, are not random access but serial access. It is not possible for NAND to access any random address in the way described above. Instead, the host has to write into the device a sequence of bytes which identifies both the type of command requested (e.g. read, write, erase, etc.) and the address to be used for that command. The address identifies a page (the smallest chunk of flash memory that can be written in a single operation) or a block (the smallest chunk of flash memory that can be erased in a single operation), and not a single byte or word.

Data of dynamic random access memory (DRAM) may be lost after a sudden power off (SPO) induced by a natural or man-made disaster. Thus, it is desirable to have a method, an apparatus and a computer program product for handling sudden power off recovery with NAND flash memory.

SUMMARY

In an aspect of the invention, a method for handling sudden power off recovery, performed by a processing unit of an electronic apparatus, is introduced to include: driving a flash interface to program data sent by a host into pseudo single-level cell (pSLC) blocks of multiple logical unit numbers (LUNs) in a single-level cell (SLC) mode with multiple channels after detecting that the electronic apparatus has suffered a sudden power off (SPO).

In another aspect of the invention, a non-transitory computer program product is introduced to have program code when executed by a processing unit of an electronic apparatus to perform steps recited in the above method.

In further aspect of the invention, an apparatus is introduced to include: a host interface; a flash interface; and a processing unit. The processing unit is coupled to the host interface and the flash interface, and arranged to operably perform operations associated with steps recited in the above method.

The pSLC blocks are reserved from being written any data in regular operations until the SPO is detected.

Both the foregoing general description and the following detailed description are examples and explanatory only, and are not restrictive of the invention as claimed.

DETAILED DESCRIPTION

Reference is made in detail to embodiments of the invention, which are illustrated in the accompanying drawings. The same reference numbers may be used throughout the drawings to refer to the same or like parts, components, or operations.

The present invention will be described with respect to particular embodiments and with reference to certain drawings, but the invention is not limited thereto and is only limited by the claims. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having the same name (but for use of the ordinal term) to distinguish the claim elements.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent." etc.)

Figure 1:
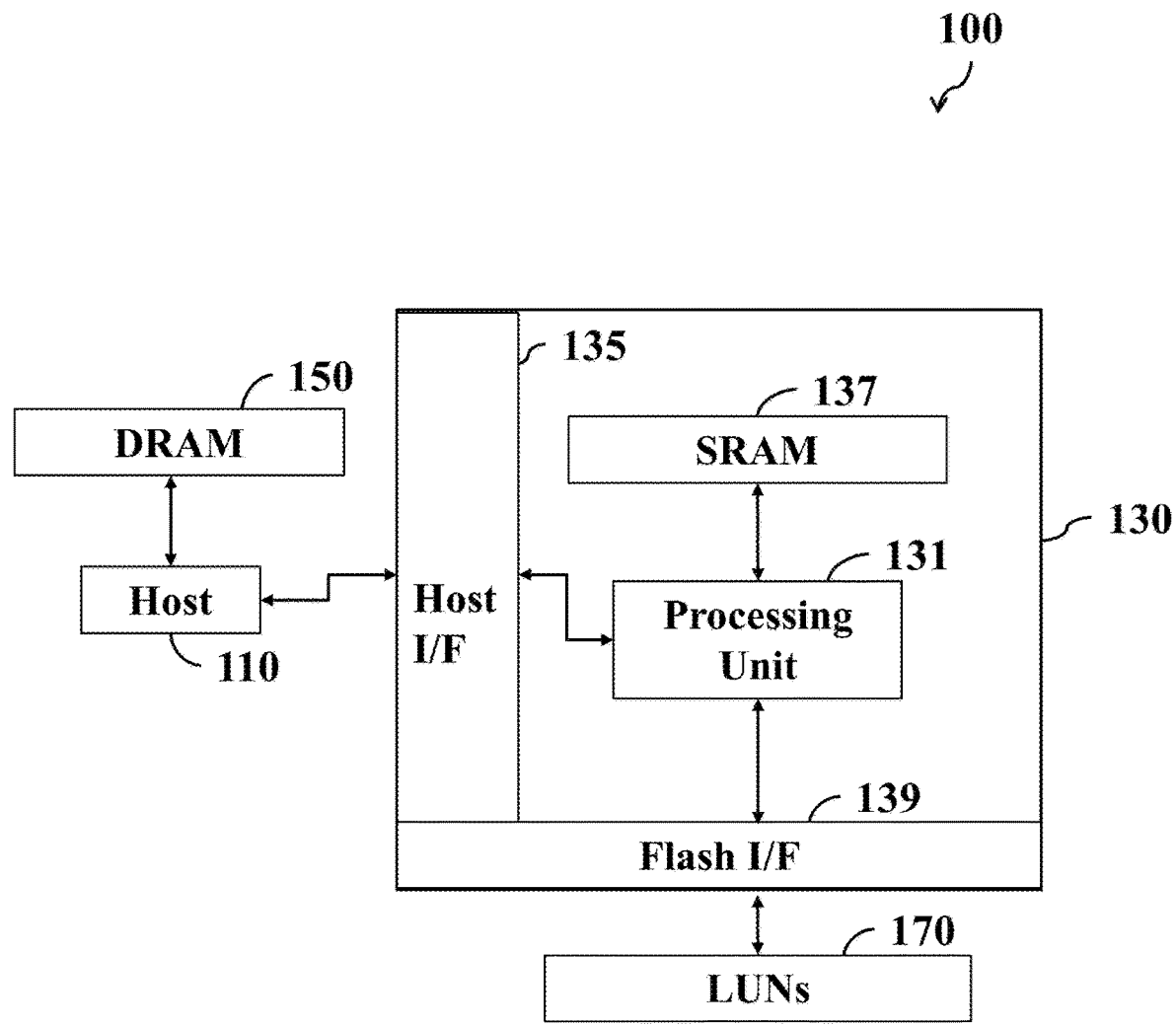
FIG. 1 is the system architecture for a flash memory device according to an embodiment of the invention.

Refer to FIG. 1. The system architecture may include a host 110, a controller 130, a Dynamic Random Access Memory (DRAM) and Logical Unit Numbers (LUNs) 170. The system architecture 100 may be practiced in a server, a personal computer (PC), a laptop PC, a tablet computer, a mobile phone, a digital camera, a digital recorder, or other electronic consumer products. The controller 130 is an Application-Specific Integrated Circuit (ASIC) for controlling data access to the LUNs 170, which includes a processing unit 131, a host interface (I/F) 135 and a flash I/F 139. The LUNs 170 may provide storage space, such as 16, 32, 64 Gigabytes (GBs), for a boot disk and a data cache. Memory cells of the LUNs 170 may be Triple Level Cells (TLC) or Quad-Level Cells (QLCs). When each memory cell is TLC capable of recording eight states, one physical wordline may include pages P #0 (referred to as Most Significant Bit MSB pages), pages P #1 (referred to as Center Significant Bit CSB pages) and pages P #2 (referred to as Least Significant Bit LSB pages). When each NAND memory cell is QLC capable of recording sixteen states, in addition to MSB, CSB and LSB pages, one physical wordline may further include Top Significant Bit (TSB) pages. A Static Random Access Memory (SRAM) 137 may store necessary data in execution, such as variables, data tables, or others, that is required by the processing unit 131. The processing unit 131 may communication with the NAND flash 170 through the flash I/F 139, for example, using Open NAND Flash Interface (ONFI), DDR toggle, or others.

The controller 130 may include the processing unit 131 that communicate with the host 110 through the host I/F 135. The host I/F 135 may be Universal Flash Storage (UFS), Non-Volatile Memory Express (NVMe), Universal Serial Bus (USB), Advanced Technology Attachment (ATA), Serial Advanced Technology Attachment (SATA), Peripheral Component Interconnect Express (PCI-E), or others. Any of the host 110 and the processing unit 131 may be implemented in numerous ways, such as with general-purpose hardware that is programmed when loading and executing relevant software or firmware instructions to perform the functions recited herein, such as a single-core processor, a multi-core processor with parallel computation capability, or others. The multi-core processor is a single computing component with two independent processors cores (referred to as multi-core) or more, which load and execute program codes.

Figure 2:
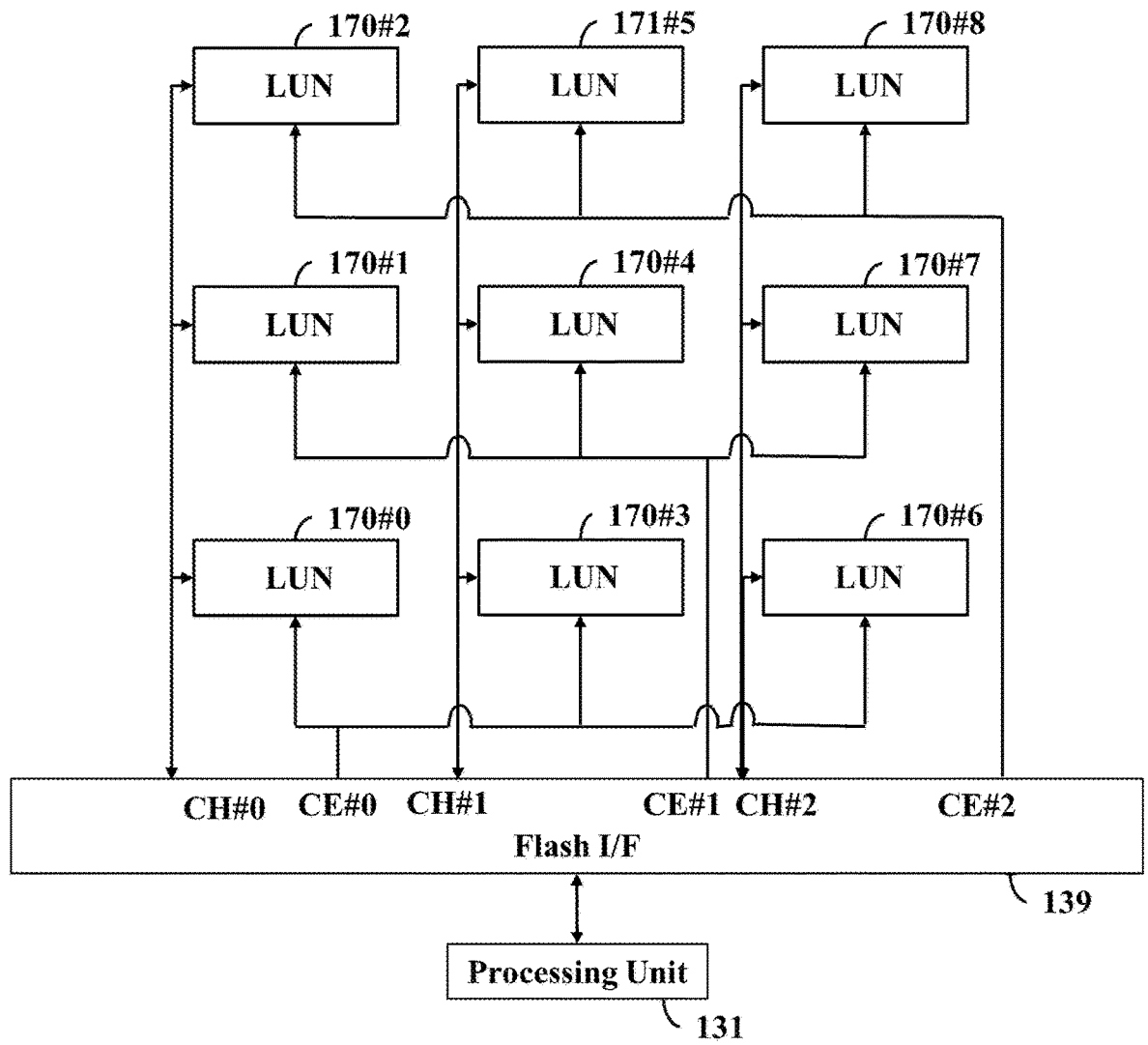
FIG. 2 is a schematic diagram depicting connections between one access interface and multiple logical Unit Numbers (LUNs) according to an embodiment of the invention.

Refer to FIG. 2. The flash I/F 139 may contain three I/O channels (hereinafter referred to as channels) CH #0 to CH #2 and each channel is connected to three LUNs, for example, the channel CH # is connected to LUNs 170 #0 to 170 #2, the channel CH #1 is connected to LUNs 170 #3 to 170 #5, and so on. In other words, multiple LUNs may share a single channel. For example, the processing unit 131 may drive the flash I/F 139 to issue the enabling signal CE #0 to activate LUNs 170 #0, 170 #3 and 170 #6, and then read or program user data from or into the activated LUNs in parallel.

Figure 3:
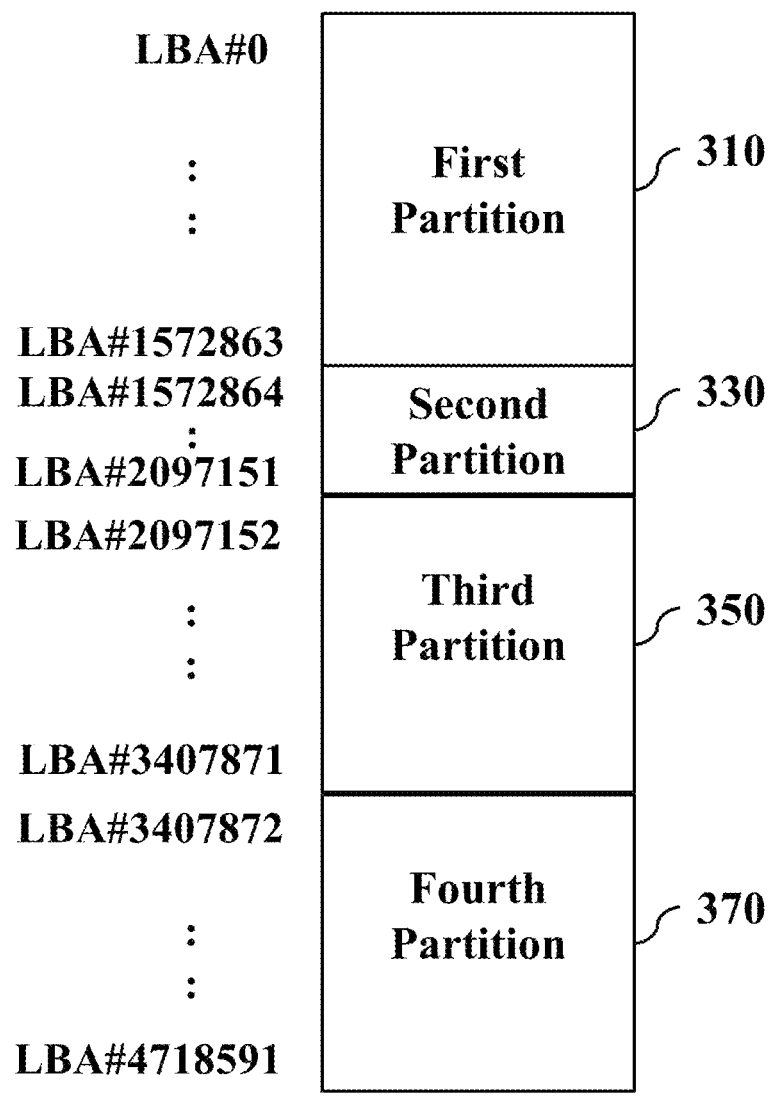
FIG. 3 is a schematic diagram of logical partitions according to an embodiment of the invention.

Storage space of the data-storage device may be logically segmented into multiple partitions for storing different types of data and each partition is addressed by continuous logical addresses, for example, Logical Block Addresses (LBAs). For example, each LBA may be associated with data of 512, 4K, 16K bytes, or others. Although the following passages describe data of one LBA being 4 KB, there are just examples and the invention should not be limited thereto. Refer to FIG. 3. The first partition 310 may occupy 6 GB space addressed from LBA #0 to LBA #1,572,863 in correspondence to user data (hereinafter referred to as data) managed by the host 110, for example, program codes related to an Operating System (OS). The second partition 330 may occupy 2 GB space addressed from LBA #1,572,864 to LBA #2,097,151 in correspondence to data managed by the host 110, for example, program codes related to applications. The third partition 350 may occupy 5 GB space addressed from LBA #2,097,152 to LBA #3,407,871 in correspondence to data managed by the host 110, for example, cache data that is generated when the host 110 operates. A Dynamic Random Access Memory (DRAM) 150 stores data that is required by the processing unit 131 in execution, such as variables, data tables, thread context, or others. To prevent data of the DRAM 150 from being lost after a sudden power off (SPO), the host 110 immediately requests the data-storage device through the host I/F 135 to program data of the DRAM 150 into the LUNs 170 when detecting a SPO. For this purpose, the data-storage device may allocate a fourth partition 370 occupying 5 GB space addressed from LBA #3,407,872 to LBA #4,718,591 in correspondence to data stored in the DRAM 150. The length of the fourth partition 370 may be a predefined value, for example, 5 GB, or equal to data stored in the size of the DRAM 150. After that, the host 110 may request the data-storage device to provide data of the fourth partition 370 in a system recovery, and thus, promptly obtain data originally stored in the DRAM 150.

Figure 4:
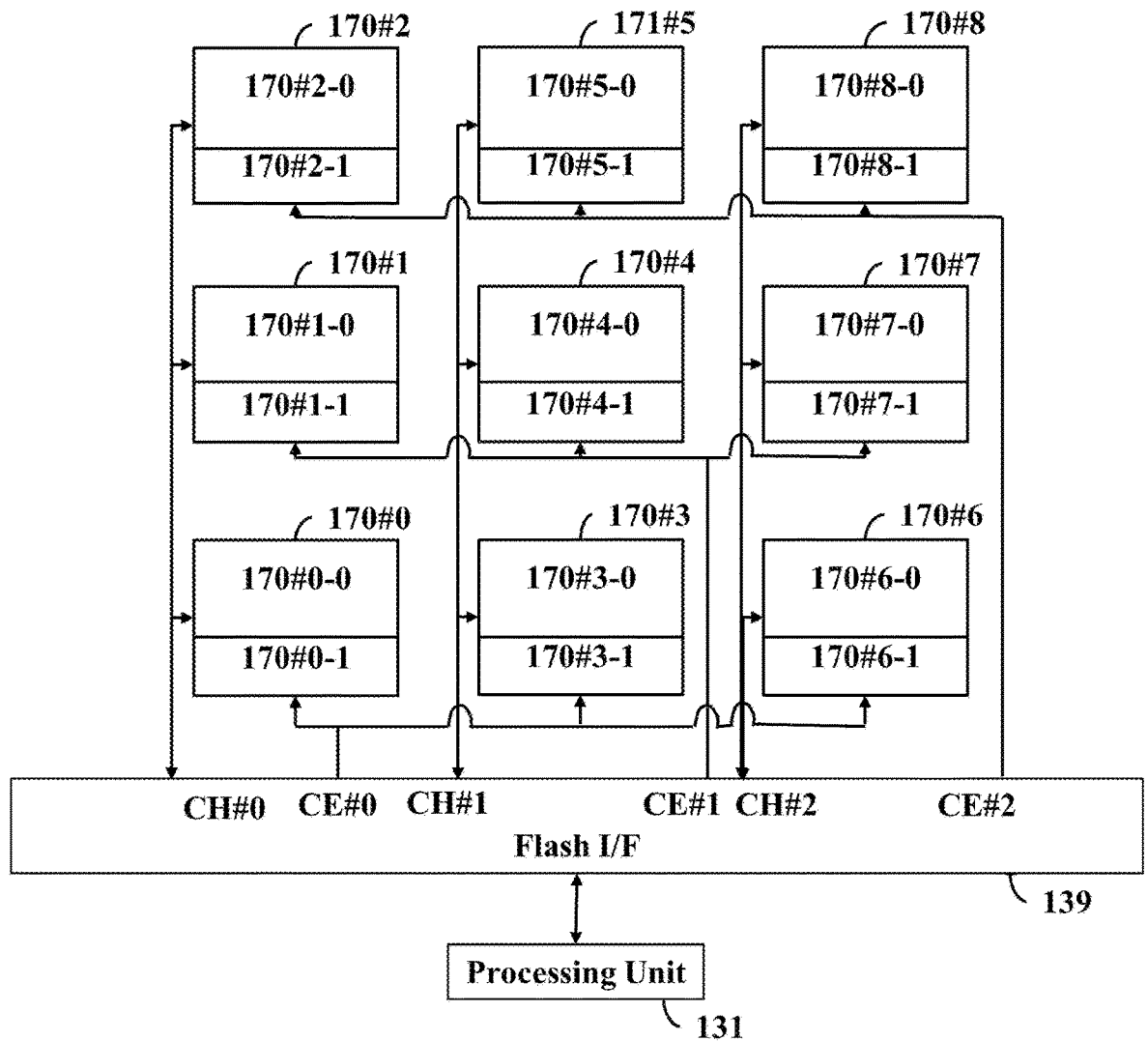
FIG. 4 is a schematic diagram of physical-block divisions of LUNs according to an embodiment of the invention.

Refer to FIG. 4. Physical blocks of each LUN of the data-storage device may be divided into normal blocks and pseudo single-level cell (pSLC) blocks depending on different operating purposes or programming manners. For example, physical blocks of the LUN 170 #0 may be configured to include 800 normal blocks 170 #0-0 and 400 pSLC blocks 170 #0-1, physical blocks of the LUN 170 #1 may be configured to include 800 normal blocks 170 #1-0 and 400 pSLC blocks 170 #1-1, and so on. The processing unit 131 preferably stores configuration information about the normal and pSLC blocks of the LUNs 170 #0 to 170 #8 in the SRAM 137. The normal blocks provide storage space for the first partition 310, the second partition 330 and the third partition 350 for storing data written by the host in regular operations, such as OS files, application files, etc. Since the memory cells of each LUN are TLCs or QLCs, the processing unit 131 may drive the flash I/F 139 to employ multi-programming phases, such as the foggy programming, the fine programming, and the like, to program data into memory cells of the normal blocks.

On the other hand, the pSLC blocks provide storage space of the fourth partition 370, thus, are reserved from being written to during regular operations. After detecting a SPO, the processing unit 131 programs data of the DRAM 150 into the pSLC blocks in response to a request made by the host 110. The electric power supplied from the host 110 typically maintain operations of the data-storage device for only few seconds (such as any ranging from 1 to 5 seconds) subsequent to the detection of a SPO. Thus, the data-storage device needs to program data stored in the DRAM 150 into the LUNs 170 within the short time period. If any data produced in a regular operation is stored in memory cells of the pSLC blocks, the processing unit 131 needs to move the data of the pSLC blocks to normal blocks, and then, erase the memory cells of the pSLC blocks. It not only takes time to perform the data movement and erase but also consumes very few electric power, resulting in a failure of programming data of the DRAM 150 into the pSLC blocks within the short time period. The processing unit 131 programs data of the DRAM 150 into memory cells of the pSLC blocks in the SLC mode with all channels using the interleave page programming. That is, the processing unit 131 programs data of the DRAM 150 into memory cells of the pSLC blocks as fast as possible, for example, in 300 MB/s, or faster. Although the embodiments describe three channels individually connected to three LUNs as an example, those artisans may modify the NAND flash architecture to include more or less channels and LUNs and the invention should not be limited thereto.

Figure 5:
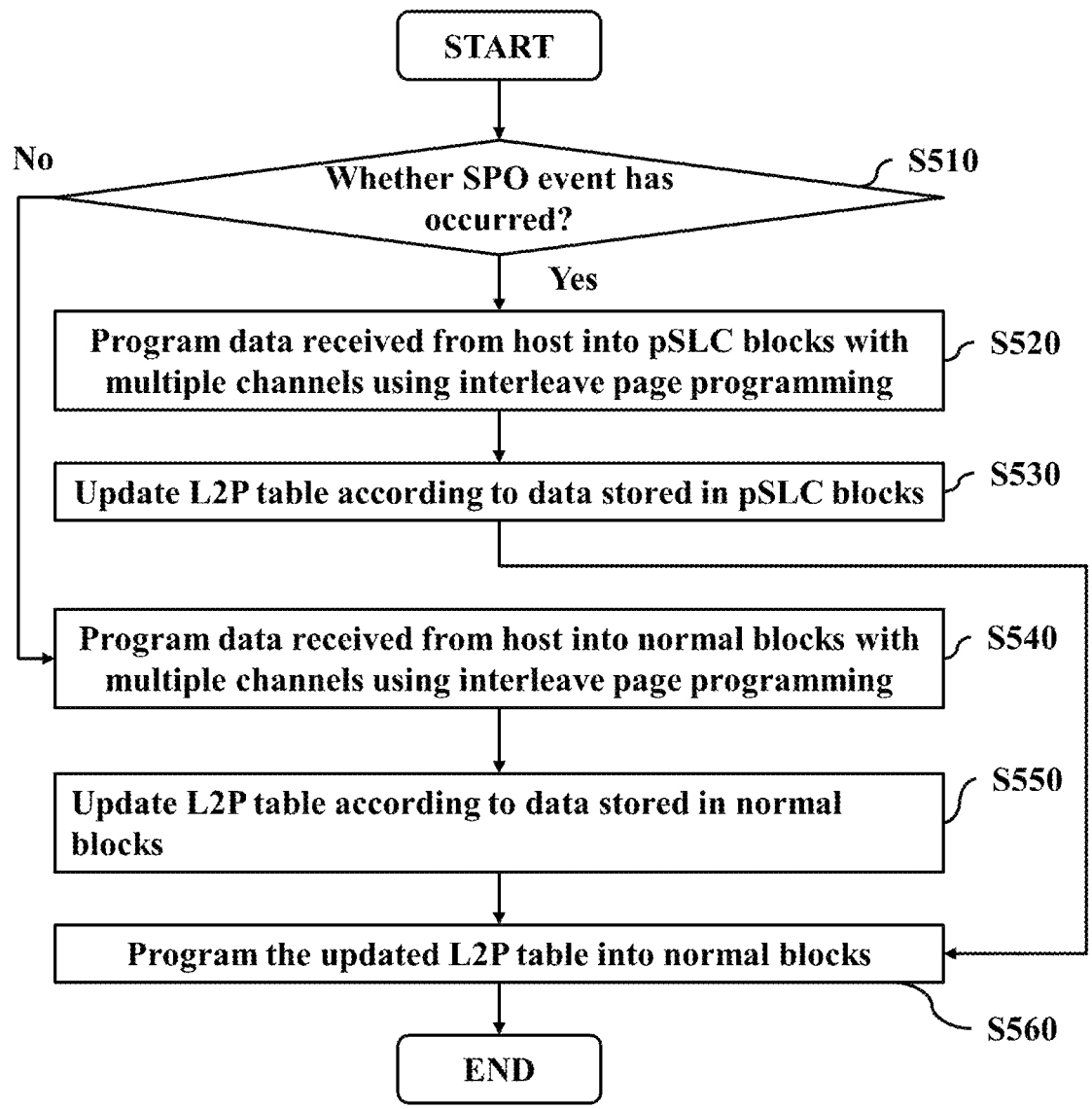
FIG. 5 is a flowchart illustrating a method for handling sudden power off recovery according to an embodiment of the invention.

Refer to FIG. 5 showing a flowchart for programming data, performed by the processing unit 131 when loading and executing relevant software or firmware instructions. In step S510, the processing unit 131 detects whether a SPO event has occurred. If so, the process proceeds to step S520. Otherwise, the process proceeds to step S540.

In step S520, the processing unit 131 programs data received from the host 110 into pSLC blocks with multiple channels using the interleave page programming, wherein the pSLC blocks are physical blocks being programmed in the SLC mode.

In step S530, the processing unit 131 updates the Logical-to-Physical (L2P) table, which is preferably stored in the SRAM 137, according to data stored in pSLC blocks.

In step S540, the processing unit 131 programs data received from the host 110 into normal blocks with multiple channels using the interleave page programming.

In step S550, the processing unit 131 updates the L2P table according to data stored in normal blocks.

In step S560, the processing unit 131 programs the updated L2P table into normal blocks, preferably in the SLC mode.

Thereafter, once electric power is restored from the host 110, the data-storage device uploads data stored in the pSLC blocks to the DRAM 150 per requests issued by the host 110. Then, the processing unit 131 may erase the pSLC blocks, thereby enabling the pSLC blocks to be programed by the processing unit 131 in response to a possible SPO event in the future.

Figure 6:
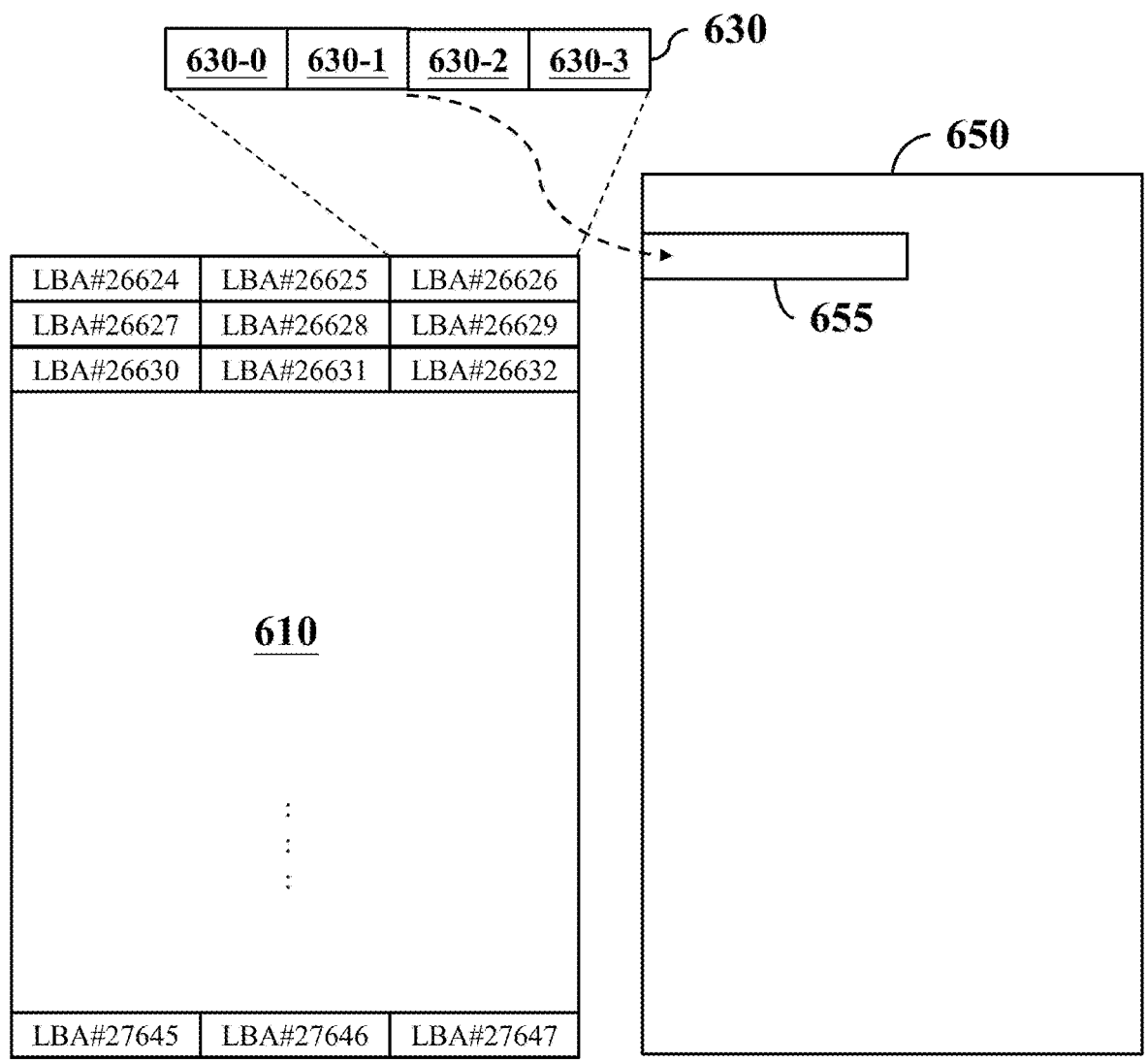
FIG. 6 is a schematic diagram of mappings of a Logical-to-Physical (L2P) to physical locations according to an embodiment of the invention.

To record mappings between logical locations (managed by the host 110) and physical locations (managed by the controller 130), the controller 130 may maintain the L2P table in the SRAM 137, which stores information about in which physical address data of each logical address stores, enabling the controller to fast lookup the corresponding physical addresses when dealing with read or write commands with designated logical addresses. Moreover, since the capacity of the SRAM 137 is limited, the L2P table may be divided into sub-tables and the controller 130 loads the needed sub-tables dynamically to the SRAM 137. Refer to FIG. 6. For example, the sub-table 610 stores information about a physical address corresponding to each logical address in the sequence of logical addresses preferably. Space required for the sub-table 610 is proportional to a total amount of logical addresses preferably. Logical addresses may be represented in LBAs. Each LBA maps to a fix-sized logical block, such as 512 B or 4 KB, and data of this LBA is stored in a physical address of the LUNs 170. The sub-table 610 stores information about the physical addresses of LBA #26624 to LBA #27647 in sequence. The physical-address information 630, for example, includes four bytes, in which the byte 630-0 records a (physical) block number, the byte 630-1 records a page number and an offset, the byte 630-2 records a plane number, and the byte 630-3 records a logical unit number and an IO channel number, and so on. For example, the physical-address information 630 corresponding to LBA #26626 may point to the region 655 of the block 650.

In some embodiments of step S510, the processing unit 131 may inspect each command issued by the host 110 and determine whether it is the STANDBY IMMEDIATE command. Details for the STANDBY IMMEDIATE command may refer to the section 7.48 of the specification ATA Command Set-4 (ACS-4). Although the STANDBY IMMEDIATE command is used by the host 110 to instruct the data-storage device to enter the Standby mode originally, the host 110 may make an agreement with the controller 130 that the host 110 issues the STANDBY IMMEDIATE command (i.e. a predefined command) to instruct the processing unit 131 to program the forthcoming data into the LUNs 170 as fast as possible when detecting a SPO event. Although embodiments describe the STANDBY IMMEDIATE command as an exemplary command, the host 110 may employ another command to instruct the processing unit 131 to achieve the same technical outcome.

In alternative embodiments of step S510, the processing unit 131 may observe host write commands of a command queue to determine whether a SPO event has occurred in the electronic apparatus. In contrary to a scenario of a mass data-storage device providing storage space, such as over 100 GB, the host 110 rarely issues commands for programming long-data in regular operations when the host 110 treats storage space of the LUNs 170 as a boot disk and a data cache. Therefore, the processing unit 131 may determine that the electronic apparatus has probably suffered a SPO when detecting a long-data write command followed by a successive write command from the command queue. It is understood that the host command contains parameters of a starting logical address and a length typically. The long-data write command may indicate a host write command instructing the processing unit 131 to program data whose length exceeds a predefined threshold (for example, 1 MB) and the successive write command may be a host write command indicating a starting logical address that is the next address of an end logical address indicated by the long-data write command.

In alternative embodiments of step S510, the processing unit 131 may observe whether a starting logical address of a host write command of the command queue falls within a preset range to determine a SPO event of the electronic apparatus. For example, refer to FIG. 3. The processing unit 131 determines that the electronic apparatus has probably suffered a SPO when detecting a starting logical address of any host write command falls within a range from LBA #3407872 and LBA #4718591.

In step S520, the processing unit 131 may issue, through the flash I/F 139, the SLC MODE ENABLE command and then, a series of PROGRAM PAGE commands to program data into preset pSLC blocks. Data programming in the SLC mode indicates that the flash I/F 139 programs each memory cell of the pSLC block to one of two states rather than eight, sixteen states, or the greater. Those artisans know that the data-programming speed in the SLC mode is better than that in the TLC or QLC mode with the Foggy-Fine techniques.

In preferred embodiments of step S520, the processing unit 131 may drive the flash I/F to program data using the interleave page programming. Taking the channel CH #0 as shown in FIG. 4 as an example, the flash I/F 139 may issue the enabling signal CE #0 to activate the LUN 170 #0 and send data to the pSLC block 170 #0-1 through the channel CH #0, and after the data transmission has completed, issue an instruction to the pSLC block to start a programming of memory cells thereof. During the actual programming of memory cells by the pSLC block 170 #0-1, the flash I/F 139 may issue the enabling signal CE #1 to activate the LUN 170 #1 and send data to the pSLC block 170 #1-1 through the channel CH #0, and so on.

In preferred embodiments of step S520, the processing unit 131 may drive the flash I/F 139 to program data sent by the host 110 with all the channels.

Figure 7:
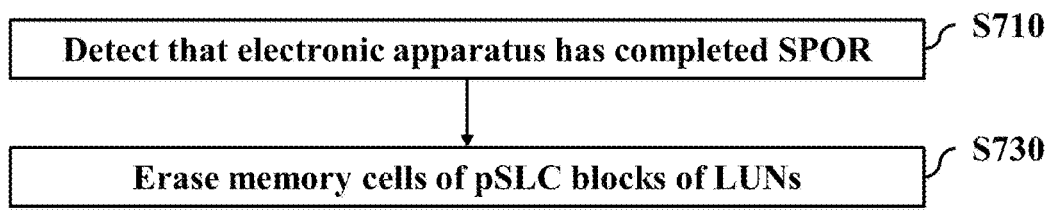
FIG. 7 is a flowchart illustrating a method for handling sudden power off recovery according to an embodiment of the invention.

Refer to FIG. 7 showing a flowchart, performed by the processing unit 131 when loading and executing relevant software or firmware instructions. After detecting that the electronic apparatus has completed a SPO recovery (SPOR) (step S710), the processing unit 131 drives the flash I/F 170 to erase memory cells of all pSLC blocks of the LUNs 170, thereby enabling the pSLC blocks to stay in the ready state for a possible SPO in the future (step S730).

The processing unit 131 may inspect the content of each DATA SET MANAGEMENT command issued by the host 110 and determine whether it indicates to trim pSLC blocks. Details for the DATA SET MANAGEMENT command may refer to the section 7.6 of the specification ACS-4. The DATA SET MANAGEMENT command may include parameters of a LBA, a trim bit or others, and the processing unit 131 may determine whether the LBA of the DATA SET MANAGEMENT command is related to a pSLC block with reference made to a L2P table and the trim bit thereof is set to "1". If so, the processing unit 131 determines that the electronic apparatus has completed a SPOR. Although embodiments describe the DATA SET MANAGEMENT command as an exemplary command, the host 110 may employ another command to instruct the processing unit 131 to achieve the same technical outcome.

In alternative embodiments of step S710, the processing unit 131 may record the executions of host read commands to facilitate a determination whether the electronic apparatus has completed a SPOR. The processing unit 131 may record an execution result of each host read command associated with the pSLC block with references made to the content of a L2P table. The processing unit 131 determines that the electronic apparatus has completed a SPOR after data of all LBAs of the L2P table, which are associated with the pSLC blocks, has been read by the host 110.

Some or all of the aforementioned embodiments of the method of the invention may be implemented in a computer program such as an operating system for a computation apparatus, a driver for a dedicated hardware of a computation apparatus, or a software application program. Other types of programs may also be suitable, as previously explained. Since the implementation of the various embodiments of the present invention into a computer program can be achieved by the skilled person using his routine skills, such an implementation will not be discussed for reasons of brevity. The computer program implementing some or more embodiments of the method of the present invention may be stored on a suitable computer-readable data carrier such as a DVD, CD-ROM, USB stick, a hard disk, which may be located in a network server accessible via a network such as the Internet, or any other suitable carrier.

The computer program may be advantageously stored on computation equipment, such as a computer, a notebook computer, a tablet PC, a mobile phone, a digital camera, a consumer electronic equipment, or others, such that the user of the computation equipment benefits from the aforementioned embodiments of methods implemented by the computer program when running on the computation equipment. Such the computation equipment may be connected to peripheral devices for registering user actions such as a computer mouse, a keyboard, a touch-sensitive screen or pad and so on.

Although the embodiment has been described as having specific elements in FIG. 1, it should be noted that additional elements may be included to achieve better performance without departing from the spirit of the invention. Each element of FIG. 1 is composed of various circuits and arranged to operably perform the aforementioned operations. While the process flows described in FIGS. 5 and 7 include a number of operations that appear to occur in a specific order, it should be apparent that these processes can include more or fewer operations, which can be executed serially or in parallel (e.g., using parallel processors or a multi-threading environment).

While the invention has been described by way of example and in terms of the preferred embodiments, it should be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A method for handling sudden power off recovery, performed by a processing unit of an electronic apparatus, comprising:
   driving a flash interface to program data sent by a host into pseudo single-level cell (pSLC) blocks of a plurality of logical unit numbers (LUNs) in a single-level cell (SLC) mode with a plurality of channels after detecting a long-data write command followed by a successive write command from a command queue,
   wherein the pSLC blocks are reserved from being written to during regular operations until the SPO is detected,
   wherein the long-data write command instructs the processing unit to program data whose length exceeds a threshold, and a starting logical address indicated by the successive write command is the next address of an end logical address indicated by the long-data write command.

2. The method of claim 1, wherein a plurality of physical blocks of each LUN are divided into normal blocks and the pSLC blocks, memory cells of the pSLC blocks are Triple Level Cells (TLCs) or Quad-Level Cells (QLCs), and a data programming in the SLC mode programs each memory cell of the pSLC blocks to one of two states.

3. The method of claim 1, comprising:
   driving the flash interface to program data sent by the host into the pSLC blocks of the LUNs using an interleave page programming after detecting the long-data write command followed by the successive write command from the command queue.

4. The method of claim 1, comprising:
   driving the flash interface to erase memory cells of all the pSLC blocks after detecting that the electronic apparatus has completed a sudden power off recovery (SPOR).

5. The method of claim 4, comprising:
   determining that the electronic apparatus has completed the SPOR when detecting a command indicating to trim the pSLC blocks, which is sent by the host.

6. The method of claim 4, comprising:
   determining that the electronic apparatus has completed the SPOR when data of all pSLC blocks has been read by the host.

7. A non-transitory computer storage medium for handling sudden power off recovery when executed by a processing unit of an electronic apparatus, the non-transitory computer storage medium comprising program code to:
   drive a flash interface to program data sent by a host into pseudo single-level cell (pSLC) blocks of a plurality of logical unit numbers (LUNs) in a single-level cell (SLC) mode with a plurality of channels after detecting a long-data write command followed by a successive write command from a command queue,
   wherein the pSLC blocks are reserved from being written to during regular operations until the SPO is detected,
   wherein the long-data write command instructs the processing unit to program data whose length exceeds a threshold, and a starting logical address indicated by the successive write command is the next address of an end logical address indicated by the long-data write command.

8. The non-transitory computer storage medium of claim 7, comprising program code to:
drive the flash interface to program data sent by the host into the pSLC blocks of the LUNs using an interleave page programming after detecting the long-data write command followed by the successive write command from the command queue.

9. The non-transitory computer storage medium of claim 7, comprising program code to:
drive the flash interface to erase memory cells of all the pSLC blocks after detecting that the electronic apparatus has completed a sudden power off recovery (SPOR).

10. An apparatus for handling sudden power off recovery, comprising:
a host interface;
a flash interface; and
a processing unit coupled to the host interface and the flash interface, and arranged to operably drive the flash interface to program data sent by a host through the host interface into pseudo single-level cell (pSLC) blocks of a plurality of logical unit numbers (LUNs) in a single-level cell (SLC) mode with a plurality of channels after detecting a long-data write command followed by a successive write command from a command queue,
wherein the pSLC blocks are reserved from being written to during regular operations until the SPO is detected,
wherein the long-data write command instructs the processing unit to program data whose length exceeds a threshold, and a starting logical address indicated by the successive write command is the next address of an end logical address indicated by the long-data write command.

11. The apparatus of claim 10, wherein a plurality of physical blocks of each LUN are divided into normal blocks and the pSLC blocks, memory cells of the pSLC blocks are Triple Level Cells (TLCs) or Quad-Level Cells (QLCs), and a data programming in the SLC mode programs each memory cell of the pSLC blocks to one of two states.

12. The apparatus of claim 10, wherein the processing unit is arranged to operably drive the flash interface to erase memory cells of all the pSLC blocks after detecting that the apparatus has completed a sudden power off recovery (SPOR).

13. The apparatus of claim 12, wherein the processing unit is arranged to operably determine that the apparatus has completed the SPOR when detecting a DATA SET MANAGEMENT command issued by the host to instruct the processing unit to trim the pSLC blocks.

14. The apparatus of claim 12, wherein the processing unit is arranged to operably determine that the apparatus has completed the SPOR when data of all pSLC blocks has been read by the host.

15. The apparatus of claim 10, wherein the processing unit is arranged to operably drive the flash interface to program data sent by the host into the pSLC blocks of the LUNs using an interleave page programming after detecting the long-data write command followed by the successive write command from the command queue.

16. The non-transitory computer storage medium of claim 9, comprising program code to:
determine that the electronic apparatus has completed the SPOR when detecting a command indicating to trim the pSLC blocks, which is sent by the host.

17. The non-transitory computer storage medium of claim 9, comprising program code to:
determine that the electronic apparatus has completed the SPOR when data of all pSLC blocks has been read by the host.

* * * * *